United States Patent
Hasegawa et al.

(10) Patent No.: US 11,686,450 B2
(45) Date of Patent: Jun. 27, 2023

(54) VEHICLE LAMP

(71) Applicant: STANLEY ELECTRIC CO., LTD., Tokyo (JP)

(72) Inventors: Takaaki Hasegawa, Saitama (JP); Teruo Koike, Tokyo (JP); Yoshitaka Narumi, Tokyo (JP); Hideo Otsuka, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 17/600,053

(22) PCT Filed: Apr. 1, 2020

(86) PCT No.: PCT/JP2020/014997
§ 371 (c)(1),
(2) Date: Sep. 29, 2021

(87) PCT Pub. No.: WO2020/204062
PCT Pub. Date: Oct. 8, 2020

(65) Prior Publication Data
US 2022/0186904 A1     Jun. 16, 2022

(30) Foreign Application Priority Data

Apr. 5, 2019   (JP) ................................ 2019-073150

(51) Int. Cl.
*F21S 43/15* (2018.01)
*F21S 43/20* (2018.01)
(Continued)

(52) U.S. Cl.
CPC .............. *F21S 43/15* (2018.01); *F21S 43/20* (2018.01); *B60Q 1/2696* (2013.01); *B60Q 1/381* (2022.05);
(Continued)

(58) Field of Classification Search
CPC .......... F21S 43/14; F21S 43/15; G09F 13/044; F21Y 2113/10; F21Y 2113/13;
(Continued)

(56) References Cited

U.S. PATENT DOCUMENTS

2002/0053878 A1   5/2002  Natsume
2006/0232525 A1*  10/2006  Chou ................... G09G 3/32
345/83
(Continued)

FOREIGN PATENT DOCUMENTS

CN    109140378 A    1/2019
DE    3916875 A1 *  12/1990 .............. F21S 43/14
(Continued)

OTHER PUBLICATIONS

International Search Report (ISR) (and English language translation thereof) dated Jun. 16, 2020 issued in International Application No. PCT/JP2020/014997.
(Continued)

*Primary Examiner* — Colin J Cattanach
(74) *Attorney, Agent, or Firm* — Holtz, Holtz & Volek PC (57) ABSTRACT

A vehicle lamp includes a plurality of light source modules that includes light sources including a plurality of light emitting elements that emit different colors of light and lens bodies disposed in front of the light sources, and the plurality of light source modules are disposed in a matrix manner in a plane to constitute at least one light emitting area.

5 Claims, 6 Drawing Sheets

(51) Int. Cl.
  *F21S 43/14*   (2018.01)
  *G09F 13/04*   (2006.01)
  *F21Y 113/13*  (2016.01)
  *F21Y 105/14*  (2016.01)
  *F21Y 105/16*  (2016.01)
  *F21Y 113/10*  (2016.01)
  *F21Y 113/17*  (2016.01)
  *F21Y 105/12*  (2016.01)
  *B60Q 1/38*    (2006.01)
  *B60Q 1/26*    (2006.01)

(52) U.S. Cl.
  CPC .......... *F21S 43/14* (2018.01); *F21Y 2105/12* (2016.08); *F21Y 2105/14* (2016.08); *F21Y 2105/16* (2016.08); *F21Y 2113/10* (2016.08); *F21Y 2113/13* (2016.08); *F21Y 2113/17* (2016.08); *G09F 13/044* (2021.05)

(58) Field of Classification Search
  CPC .............. F21Y 2113/17; F21Y 2105/12; F21Y 2105/14; F21Y 2105/16
  See application file for complete search history.

(56) References Cited

U.S. PATENT DOCUMENTS

| | | | | |
|---|---|---|---|---|
| 2009/0309494 A1* | 12/2009 | Patterson | .............. | G09F 9/3026 |
| | | | | 445/24 |
| 2010/0165246 A1* | 7/2010 | Sekiguchi | .......... | H01L 25/0753 |
| | | | | 349/68 |
| 2010/0200872 A1* | 8/2010 | Takashima | ................ | F21K 9/00 |
| | | | | 257/E33.059 |
| 2011/0013395 A1 | 1/2011 | Melzner et al. | | |
| 2018/0363872 A1 | 12/2018 | Jo | | |

FOREIGN PATENT DOCUMENTS

| | | | | |
|---|---|---|---|---|
| JP | S61103247 U | 7/1986 | | |
| JP | 2002270011 A | 9/2002 | | |
| JP | 2007042749 A | 2/2007 | | |
| JP | 2010538433 A | 12/2010 | | |
| JP | 2013011716 A | 1/2013 | | |
| JP | 2014240855 A | 12/2014 | | |
| JP | 2015099638 A | 5/2015 | | |
| KR | 200312930 Y1 * | 5/2003 | .............. | F21S 43/14 |
| KR | 20130026001 A * | 3/2013 | .............. | F21S 43/14 |

OTHER PUBLICATIONS

Written Opinion dated Jun. 16, 2020 issued in International Application No. PCT/JP2020/014997.
Extended European Search Report (EESR) dated Dec. 12, 2022, issued in counterpart European Application No. 20782843.5.
Japanese Office Action (and English language translation thereof) dated Dec. 23, 2022, issued in counterpart Japanese Application No. 2019-073150.
Chinese Office Action (and English language translation thereof) dated Feb. 4, 2023, issued in counterpart Chinese Application No. 202080024922.X.

* cited by examiner

VEHICLE LAMP

TECHNICAL FIELD

The present invention relates to a vehicle lamp.

Priority is claimed on Japanese Patent Application No. 2019-073150, filed Apr. 5, 2019, the content of which is incorporated herein by reference.

BACKGROUND ART

For example, there are vehicle lamps such as rear combination lamps or the like mounted on both corner sections of a rear end side of a vehicle. In such vehicle lamps, function lamps such as tail lamps (including position lamps) or brake lamps configured to emit red light, turn lamps configured to emit orange light, back lamps configured to emit white light, and the like, are disposed inside a lamp body.

In the vehicle lamps in the related art, a configuration in which light emitting areas having different lamp bodies for each function lamp described above are made to emit light. In this case, it is necessary for different light source modules to be disposed in the lamp body for each function lamp.

On the other hand, it has been proposed to arrange a plurality of light sources configured to emit different colors of light in a matrix manner in a plane, and to display the above-mentioned function lamps or to display an image such as characters, signs, or the like, by controlling lighting of the light sources (for example, see the following Patent Literature 1). In addition, it has been proposed to arrange a projector and a screen in a lamp body, and to display the function lamps while projecting light source images corresponding to the above-mentioned function lamps on the screen using the projector (for example, see the following Patent Literature 2).

CITATION LIST

Patent Literature

[Patent Literature 1]
Japanese Utility Model Publication No. S61-103247
[Patent Literature 2]
Japanese Unexamined Patent Application, First Publication No. 2015-099638

SUMMARY OF INVENTION

Technical Problem

However, both of the vehicle lamps disclosed in the above-mentioned Patent Literature 1 and 2 are configured to display the function lamps on a flat display surface (a light emitting area), and it is difficult to control a light distribution for each function lamp.

For example, among the above-mentioned function lamps, the tail lamps or the brake lamps that emit red light are more frequently lighted than the other turn lamps or back lamps. In addition, there is a need to cause the brake lamp to be more brightly lighted than the tail lamp (light is emitted at a high brightness). Further, regarding the turn lamp, in order to expand a visible range, there is a need to expand an irradiation range compared with the other function lamps (diffuse the light).

On the other hand, in the vehicle lamp disclosed in the above-mentioned Patent Literatures 1 and 2, since it is difficult to control distribution of light for each function lamp, it is difficult to meet these demands.

An aspect of the present invention is directed to providing a vehicle lamp capable of controlling distribution of light when a function lamp is displayed in a light emitting area.

Solution to Problem

An aspect of the present invention provides the following configurations.

[1] A vehicle lamp including: a plurality of light source modules that includes a light sources including a plurality of light emitting elements that emit different colors of light and lens bodies disposed in front of the light sources, wherein the plurality of light source modules are disposed in a matrix manner in a plane to configure at least one light emitting area.

[2] The vehicle lamp according to the aspect of the above-mentioned [1], wherein the light source includes a red light emitting element that emits red light, a green light emitting element that emits green light, and a blue light emitting element that emits blue light.

[3] The vehicle lamp according to the aspect of the above-mentioned [2], wherein the light source includes five light emitting elements disposed in a cross shape in which one of the five light emitting elements is disposed at a central position of the cross shape, and other ones of the five light emitting elements are disposed at an upward position, a downward position, a leftward position and a rightward position while having the central position interposed therebetween, the red light emitting element is disposed at the downward position and any one position of the central position, the leftward position and the rightward position, the green light emitting element is disposed at the central position and any one position of the upward position, the leftward position and the rightward position, or disposed at the upward position and any one position of the leftward position and the rightward position, and the blue light emitting element is disposed at any one position of the upward position, the leftward position and the rightward position.

[4] The vehicle lamp according to the aspect of the above-mentioned [3], wherein an optical axis center of the lens body is located between two positions at which the red light emitting elements are disposed.

[5] The vehicle lamp according to any one of the aspects of the above-mentioned [1] to [4], wherein, in the plurality of light source modules, the light sources are disposed on a same board, and the lens bodies constitute a lens array.

[6] The vehicle lamp according to any one of the aspects of the above-mentioned [1] to [5], including a lighting controller configured to control lighting of the plurality of light emitting elements for each of the light source modules, wherein the lighting controller performs control of variably displaying any one or more function lamps of a tail lamp that emits red light, a brake lamp that emits red light, a turn lamp that emits orange light, and a back lamp that emits white light, in the light emitting area.

[7] The vehicle lamp according to any one of the aspects of the above-mentioned [1] to [6], wherein a lighting controller configured to control lighting of the plurality of light emitting elements for each of the light source modules performs control of displaying an image in the light emitting area.

Advantageous Effects of Invention

According to the aspect of the present invention, it is possible to provide a vehicle lamp capable of controlling distribution of light when a function lamp is displayed in a light emitting area.

DESCRIPTION OF EMBODIMENTS

Hereinafter, embodiments of the present invention will be described in detail with reference to the accompanying drawings.

Further, in the drawings used in the following description, in order to make each component easier to see, scales of dimensions may be shown differently depending on the components, and dimensional ratios or the like of each component are not always the same as the actual ones.

For example, a vehicle lamp 1 shown in FIGS. 1 and 2 will be described as an embodiment of the present invention.

Figure 1:
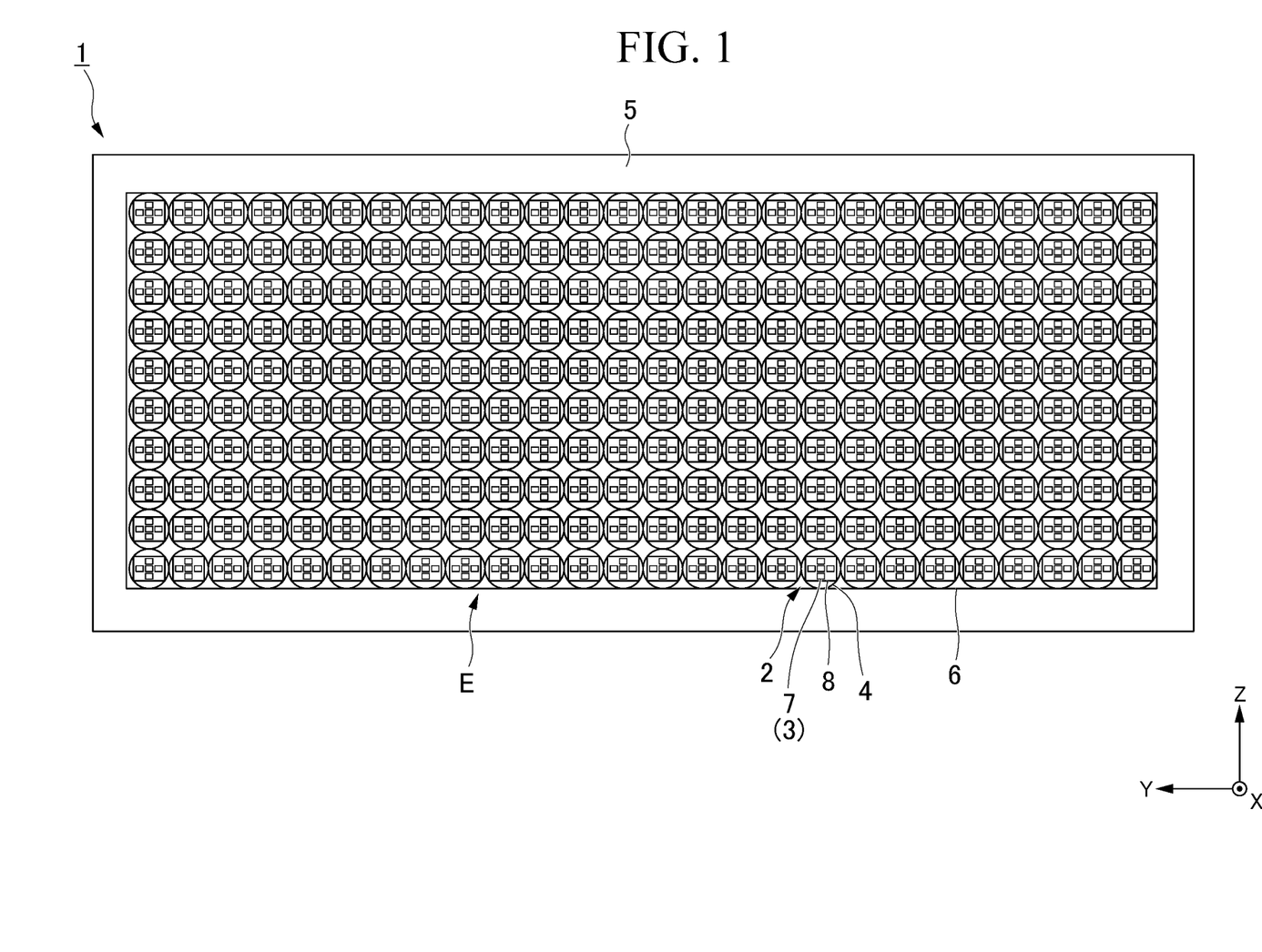
FIG. 1 is a plan view showing a configuration of a vehicle lamp according to an embodiment of the present invention.

Further, FIG. 1 is a plan view showing a configuration of the vehicle lamp 1. FIG. 2 is a cross-sectional view showing a part of the vehicle lamp 1.

In addition, in the drawings described as below, XYZ orthogonal coordinates are set, an X-axis direction indicates a forward/rearward direction (a lengthwise direction) of the vehicle lamp 1, a Y-axis direction indicates a leftward/rightward direction (a widthwise direction) of the vehicle lamp 1, and a Z-axis direction indicates an upward/downward direction (a height direction) of the vehicle lamp 1.

For example, the vehicle lamp 1 of the embodiment is obtained by applying the present invention to rear combination lamps mounted on both corner sections of a rear end side of the vehicle (not shown) (in the embodiment, a corner section on a left rear end side).

Further, in the following description, references to "forward," "rearward," "leftward," "rightward," "upward" and "downward" mean respective directions when viewing the vehicle lamp 1 in front (from the rear of the vehicle) unless otherwise specified. Accordingly, the directions are directions in which "forward," "rearward," "leftward" and "rightward" are reversed compared to when the vehicle is seen in the front (from the front of the vehicle).

The vehicle lamp 1 of the embodiment includes, as shown in FIG. 1, a plurality of light source modules 2 at inside a lamp body (not shown), and configures at least one light emitting area E due to the plurality of light source modules 2 being disposed in a matrix manner in a plane.

Further, in the embodiment, the light emitting area E in a rectangular shape is configured by disposing the plurality of light source modules 2 in a matrix manner in a plane. Further, the vehicle lamp 1 is not limited to the configuration including a single light emitting area E and may be configured to include a plurality of light emitting areas E. In addition, a shape of the light emitting area E is not limited to the above-mentioned rectangular shape, and can be changed as appropriate according to a design or the like of the vehicle lamp 1.

Figure 2:
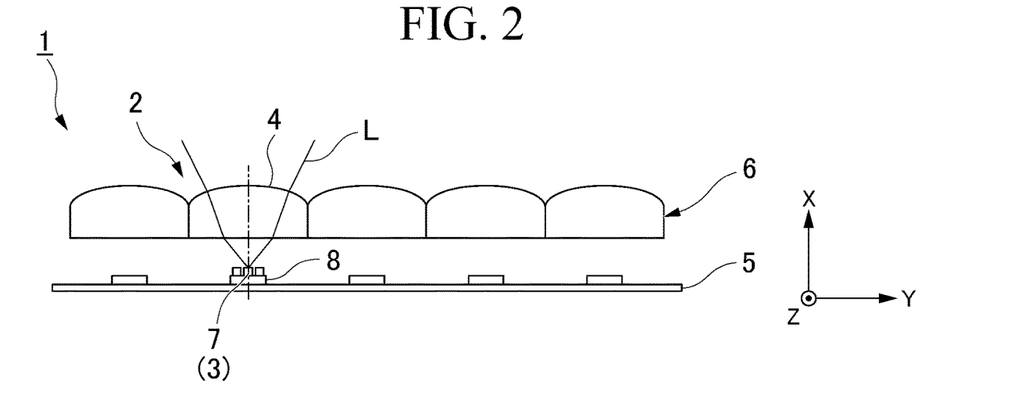
FIG. 2 is a cross-sectional view showing a part of the vehicle lamp shown in FIG. 1.

As shown in FIG. 2, the plurality of light source modules 2 each have a light source 3, and a lens body 4 disposed in front of the light source 3. In addition, in the plurality of light source modules 2, the light sources 3 are disposed on the same circuit board 5, and the lens bodies 4 constitute a lens array 6.

That is, the light sources 3 that constitute each of the light source modules 2 are disposed on one surface (a front surface) of the circuit board 5 in a matrix manner. In addition, the lens bodies 4 that constitute each of the light source modules 2 are disposed in front of each of the light sources 3 in a matrix manner to constitute one lens array 6 in which neighboring lens bodies are coupled to each other.

The light source 3 includes a plurality of light emitting elements 7 that emit different colors of light. LEDs may be used as the light emitting elements 7. The plurality of light emitting elements 7 are mounted on one surface (a front surface) of the same mounting substrate 8.

The mounting substrate 8 is electrically connected to the circuit board 6 by being mounted on the surface of the circuit board 6 on which a driving circuit (not shown) configured to drive the light emitting elements 7 is provided. Accordingly, each of the light emitting elements 7 emits light L radially forward from one surface side of the mounting substrate 7 by driving the driving circuit.

Further, while the plurality of light emitting elements 7 may be mounted on the above-mentioned mounting substrate 8, they may be directly mounted on the circuit board 6 with the mounting substrate 8 omitted. In addition, the driving circuit is not limited to being mounted on the above-mentioned circuit board 6 and may be mounted on the mounting substrate 8. Further, a driving circuit board (not shown) on which the driving circuit is provided and the circuit board 6 may be separately disposed, the driving circuit board and the circuit board 6 may be electrically connected via a wiring cord (not shown) referred to as a harness, and thus, the driving circuit can be protected from heat emitted from the plurality of light emitting elements 7.

The lens body 4 is constituted by a convex lens in which one surface (a rear surface) facing the light source 2 is a flat surface 4a and the other surface (a front surface) opposite thereto is an aspherical surface 4b.

Here, disposition of the plurality of light emitting elements 7 will be described with reference to FIGS. 3A, 3B, 4A, 4B, 5A and 5B. Further, FIGS. 3A, 3B, 4A, 4B, 5A and 5B show disposition of the plurality of light emitting elements 7 that constitute the light source 3 in the light source module 2 and a position of an optical axis center S of the lens body 4, FIGS. 3A, 4A and 5A are plan views showing a light source 3L for the left side, and FIGS. 3B, 4B and 5B are plan views showing a light source 3R for the right side.

As shown in FIGS. 3A, 3B, 4A, 4B, 5A and 5B, the light source 3 includes five light emitting elements 7 disposed in a cross shape in which one of the five light emitting elements is disposed at a central position in a plane of the mounting substrate 8, and other ones of the five light emitting elements are disposed at an upward position, a downward position, a leftward position and a rightward position while having the central position interposed therebetween. The five light emitting elements 7 are constituted by two red light emitting elements 7R that emit red light (R), two green light emitting elements 7G that emit green light (G), and a blue light emitting element 7B that emits blue light (B). Further, the reason why only one blue light emitting element 7B is used is that the light emitting efficiency thereof is better than in the red light emitting elements 7R and the green light emitting elements 7G.

Among the five light emitting elements 7 (7R, 7G, 7B), the two red light emitting elements 7R are disposed at the downward position and any one position of the central position, and the leftward position and the rightward position, that are adjacent to the downward position.

Figure 3A:
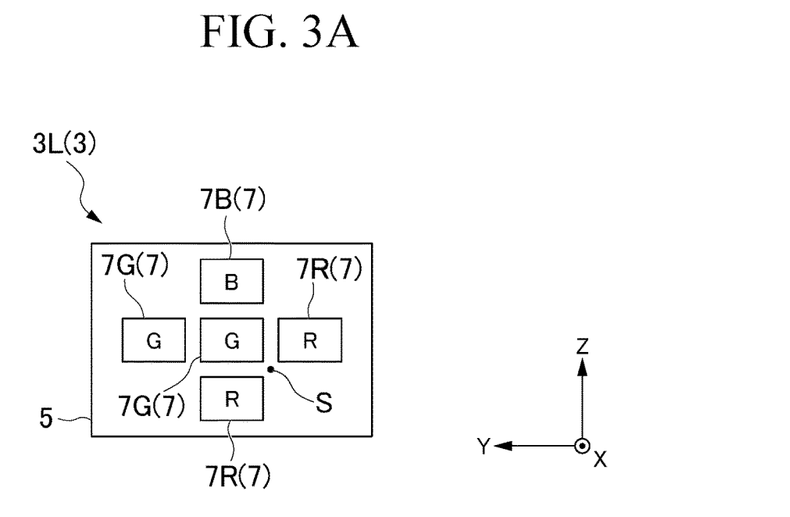
FIG. 3A is a plan view showing a light source for the right side, and showing an example of a disposition of a plurality of light emitting elements that constitute a light source in a light source module and a position of an optical axis center of a lens body.
Figure 3B:
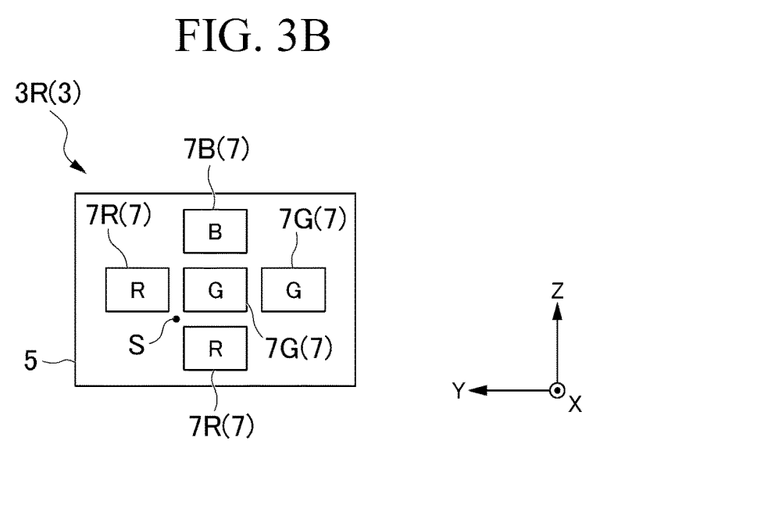
FIG. 3B is a plan view showing a light source for the left side, and showing an example of disposition of a plurality of light emitting elements that constitute a light source in the light source module and a position of an optical axis center of the lens body.
Figure 4A:
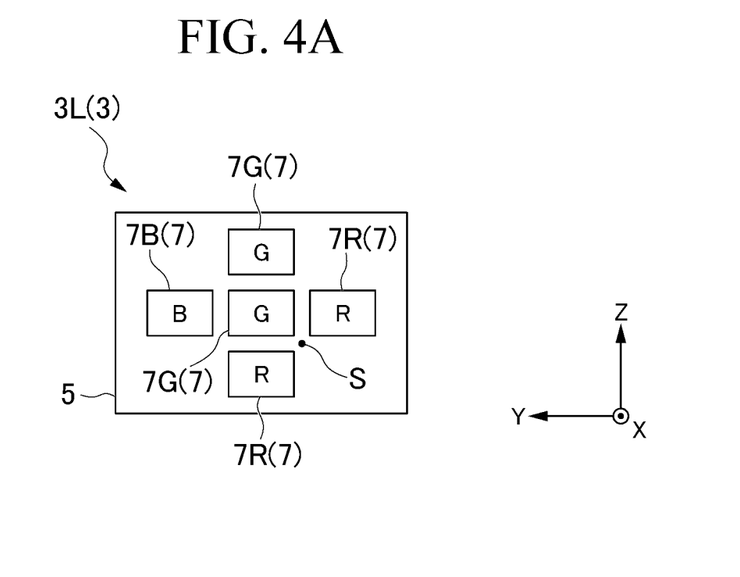
FIG. 4A is a plan view showing a light source for the right side, and showing an example of disposition of a plurality of light emitting elements that constitute a light source in the light source module and a position of an optical axis center of the lens body.
Figure 4B:
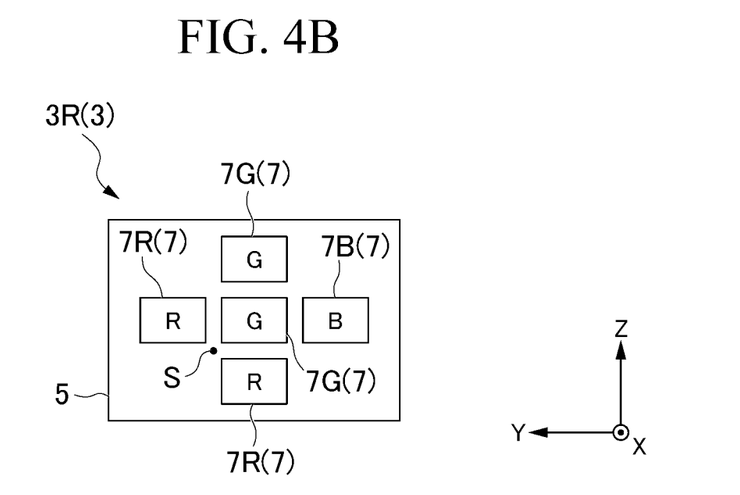
FIG. 4B is a plan view showing a light source for the left side, and showing an example of disposition of a plurality of light emitting elements that constitute a light source in the light source module and a position of an optical axis center of the lens body.
Figure 5A:
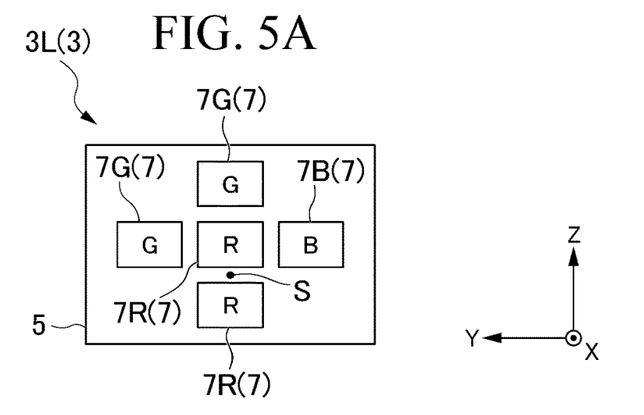
FIG. 5A is a plan view showing a light source for the right side, and showing an example of disposition of a plurality of light emitting elements that constitute a light source in the light source module and a position of an optical axis center of the lens body.
Figure 5B:
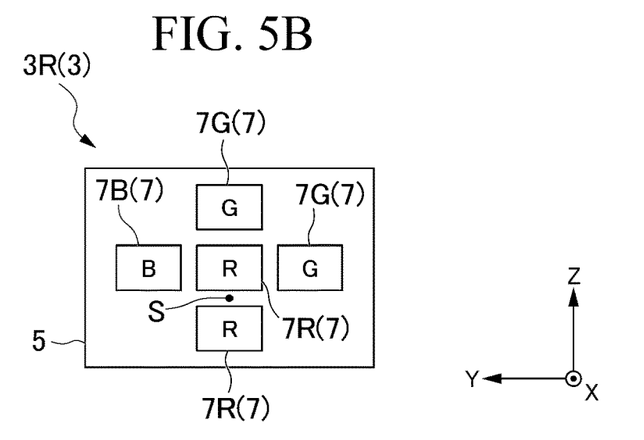
FIG. 5B is a plan view showing a light source for the left side, and showing an example of disposition of a plurality of light emitting elements that constitutes a light source in the light source module and a position of an optical axis center of the lens body.

Specifically, in the light source 3L for the left side shown in FIGS. 3A and 4A, the two red light emitting elements 7R are disposed at the downward position and the rightward position. On the other hand, in the light source 3R for the right side shown in FIGS. 3B and 4B, the two red light emitting elements 7R are disposed at the downward position and the leftward position. In addition, in the light source 3L for the left side and the light source 3R for the right side shown in FIGS. 5A and 5B, the two red light emitting elements 7R are disposed at the downward position and the central position.

Meanwhile, the two green light emitting elements 7G are disposed at the central position and any one position of the upward position, and the leftward position and the rightward position, that are adjacent to the central position. Alternatively, the two green light emitting elements 7G may be disposed at the upward position and any one position of the leftward position and the rightward position that are adjacent to the upward position.

Specifically, in the light source 3L for the left side shown in FIG. 3A, the two green light emitting elements 7G are disposed at the central position and the leftward position. On the other hand, in the light source 3R for the right side shown in FIG. 3B, the two green light emitting elements 7G are disposed at the central position and the rightward position. In addition, in the light source 3L for the left side and the light source 3R for the right side shown in FIGS. 4A and 4B, the two green light emitting elements 7G are disposed at the central position and the upward position. In addition, in the light source 3L for the left side shown in FIG. 5A, the two green light emitting elements 7G are disposed at the upward position and the leftward position. On the other hand, in the light source 3R for the right side shown in FIG. 5B, the two green light emitting elements 7G are disposed at the upward position and the rightward position.

The one blue light emitting element 7B is disposed at any one position of the upward position, the leftward position and the rightward position. Specifically, in the light source 3L for the left side and the light source 3R for the right side shown in FIGS. 3A and 3B, the one blue light emitting element 7B is disposed at the upward position. In addition, in the light source 3L for the left side shown in FIG. 4A, the one blue light emitting element 7G is disposed at the leftward position. On the other hand, in the light source 3R for the right side shown in FIG. 4B, the one blue light emitting element 7B is disposed at the rightward position. In addition, in the light source 3L for the left side shown in FIG. 5A, the one blue light emitting element 7G is disposed at the rightward position. On the other hand, in the light source 3R for the right side shown in FIG. 5B, the one blue light emitting element 7B is disposed at the leftward position.

The light source 3R for the right side is applied to the vehicle lamp 1 mounted on a right corner section of a rear end side of the vehicle. Meanwhile, the light source 3L for the left side is applied to the vehicle lamp 1 mounted on a left corner section of a rear end side of the vehicle. As described above, the light source 3R for the right side and the light source 3L for the left side have a laterally symmetrical disposition for the plurality of light emitting elements 7R, 7G and 7B.

The optical axis center S of the lens body 4 is located between two positions at which the red light emitting elements 7R are disposed. That is, the optical axis center S of the lens body 4 locates at a position that is offset toward a side at which the two red light emitting elements 7R are located from the central position of the light source 3.

Specifically, in the light source 3L for the left side shown in FIGS. 3A and 4A, the optical axis center S of the lens body 4 is located between the downward position and the rightward position at which the two red light emitting elements 7R are disposed. On the other hand, in the light source 3R for the right side shown in FIGS. 3B and 4B, the optical axis center S of the lens body 4 is located between the downward position and the leftward position at which the two red light emitting elements 7R are disposed. In addition, in the light source 3L for the left side and the light source 3R for the right side shown in FIGS. 5A and 5B, the optical axis center S of the lens body 4 is disposed between the downward position and the central position at which the two red light emitting elements 7R are disposed.

In addition, the central axis of the light source 3 and the central axis of the lens body 4 matches with each other. Accordingly, the optical axis center S of the lens body 4 is located at a position deviated from the central axis of the lens body 4. Further, the optical axis of the lens body 4 may be inclined with respect to the central axis of the lens body 4. The lens body 4 can arbitrarily adjust light distribution properties of light due to the lens body 4 by employing the above mentioned aspherical surface 4b.

Figure 6:
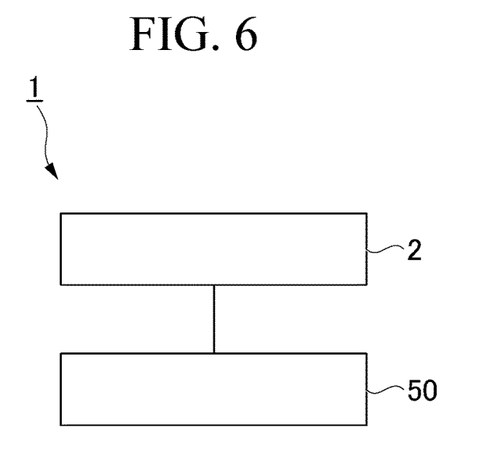
FIG. 6 is a block diagram showing a configuration of a light distribution control part included in the vehicle lamp shown in FIG. 1.

As shown in FIG. 6, the vehicle lamp 1 of the embodiment includes a lighting controller 50 configured to control lighting of the plurality of light emitting elements 7 (7R, 7G and 7B) for each of the light source modules 2. Further, FIG. 6 is a block diagram showing a configuration of the light distribution controller 50.

The lighting controller 50 can control the lighting of the light emitting elements 7 (7R, 7G and 7B) by the driving circuit provided on the circuit board 5 by being electrically connected to the circuit board 5.

In addition, the lighting controller 50 controls lighting of each of the light emitting elements 7 (7R, 7G and 7B) that constitutes each of the light source modules 2 through pulse width modulation. Specifically, a duty ratio of a pulse signal (rectangular wave) input to each of the light emitting elements 7 (7R, 7G, 7B) from the lighting controller 50 is adjusted.

Accordingly, a color tone and a quantity of light of the light L emitted from each of the light source modules 2 can be variably controlled according to a light emitting ratio between red light (R) emitted from the red light emitting elements 7R, green light (G) emitted from the green light emitting elements 7G, and blue light (B) emitted from the blue light emitting element 7B.

Accordingly, in the vehicle lamp 1 of the embodiment, it is possible to perform emission (display) in an arbitrary color including color display in the light emitting area E by controlling lighting of the plurality of light emitting elements 7 (7R, 7G and 7B) of each of the light source modules 2 with the lighting controller 50.

Figure 7:
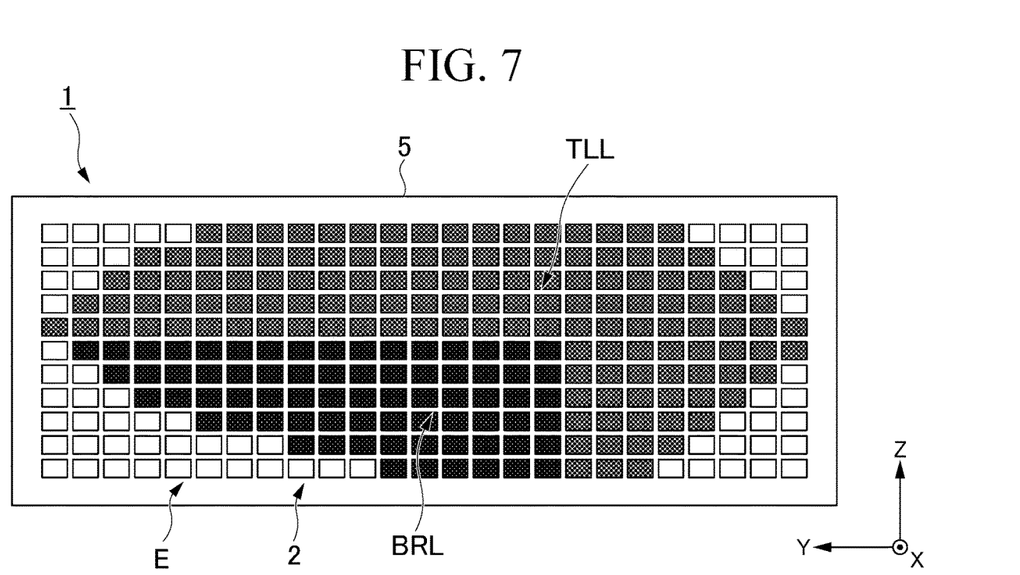
FIG. 7 is a plan view showing an example of a function lamp displayed in a light emitting area.
Figure 8:
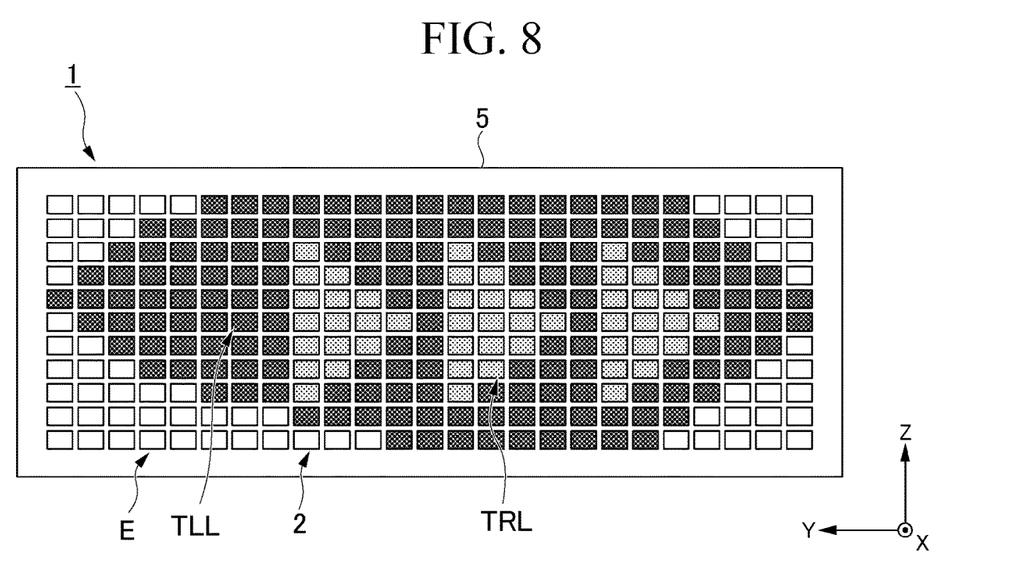
FIG. 8 is a plan view showing an example of the function lamp displayed in the light emitting area.
Figure 9:
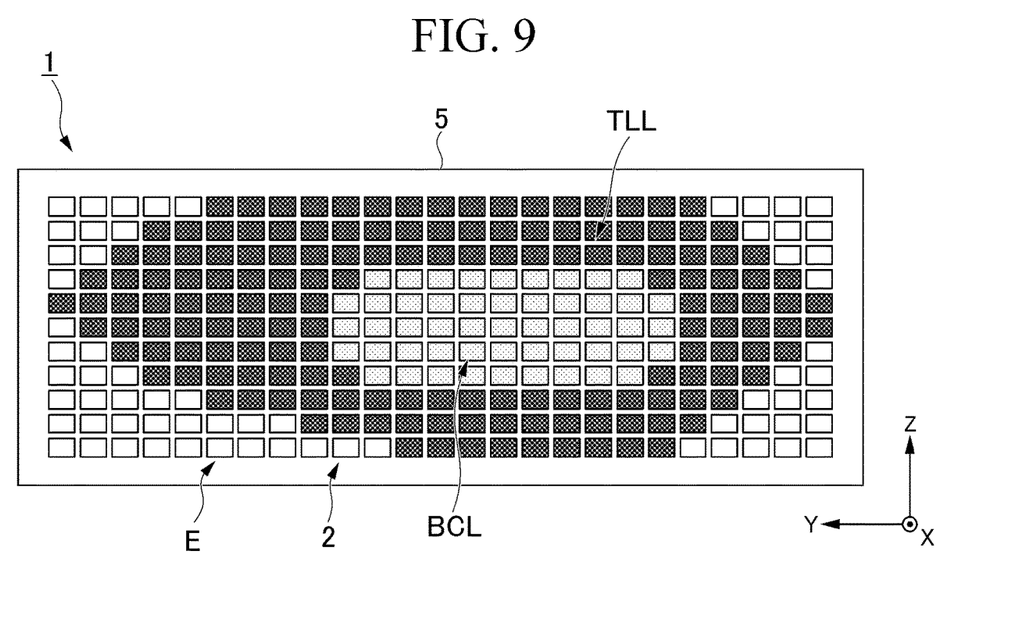
FIG. 9 is a plan view showing an example of the function lamp displayed in the light emitting area.

Specifically, for example, as shown in FIGS. 7, 8 and 9, the lighting controller 50 performs control of variably displaying any one or more function lamps of a tail lamp TLL that emits red light, a brake lamp BRL that emits red light, a turn lamp TRL that emits orange light, and a back lamp BCL that emits white light in the light emitting area E on the basis of a command signal supplied from the vehicle side. Further, FIGS. 7, 8 and 9 are plan views showing an example of a function lamp displayed in the light emitting area E.

For example, in the light emitting area E, as shown in FIG. 7, by making the light source modules 2 in a region corresponding to the tail lamp TLL to emit red light (weak emission), it is possible to make the region to function as the tail lamp TLL. In addition, by making the light source modules 2 in a region corresponding to the brake lamp BRL to emit red light (strong emission), it is possible to make the region to function as the brake lamp BRL.

In addition, in the light emitting area E, as shown in FIG. 8, by making the light source modules 2 in a region corresponding to the turn lamp TRL to blink with orange light, it is possible to make the region to function as the turn lamp TRL. In addition, it is also possible to make the region corresponding to the turn lamp TRL to be moved in a direction indicated by the turn lamp TRL. Further, the orange light can be obtained by mixing the red light (R) and the green light (G).

In addition, in the light emitting area E, as shown in FIG. 9, by making the light source modules 2 in a region corresponding to the back lamp BCL to emit white light, it is possible to make the region to function as the back lamp BCL. Further, the white light can be obtained by mixing the red light (R), the green light (G) and the blue light (R).

As described above, in the vehicle lamp 1 of the embodiment, different function lamps can be variably displayed in the one light emitting area E without dividing the light emitting area E for each of the above-mentioned function lamps.

Figure 10:
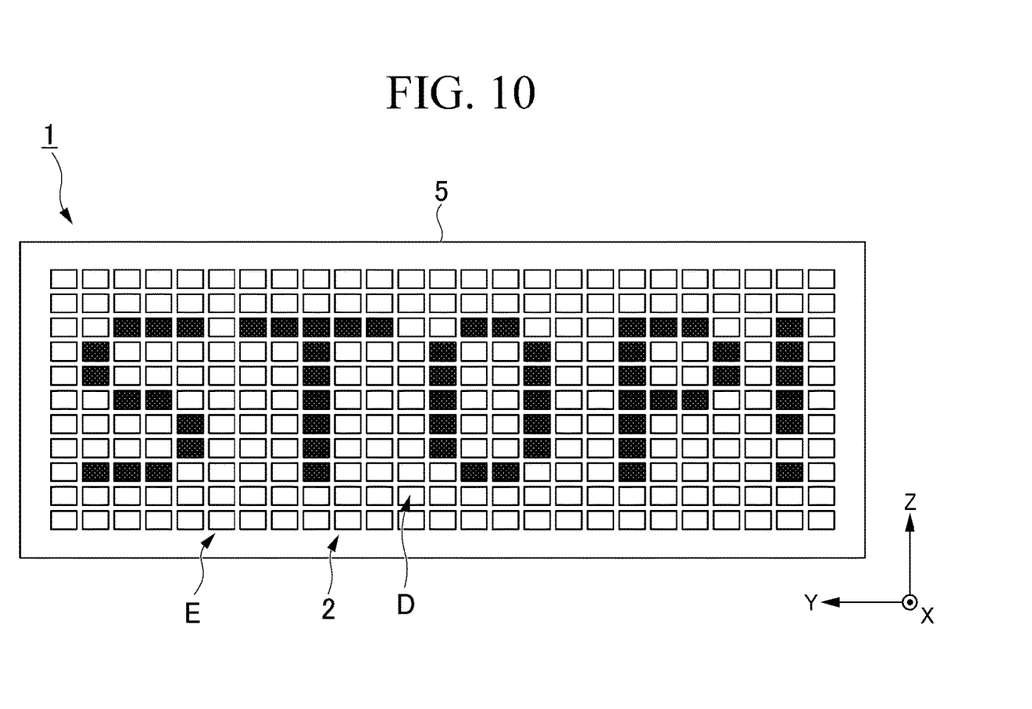
FIG. 10 is a plan view showing an example of an image displayed in the light emitting area.

In addition, for example, as shown in FIG. 10, the lighting controller 50 can also perform control of displaying an image D in the light emitting area E. Further, FIG. 10 is a plan view showing an example of an image D displayed in the light emitting area E.

For example, in the light emitting area E, as shown in FIG. 10, in the light emitting area E, it is possible to display characters such as "STOP!". Further, the image D is not limited to such characters, and may be numerals, signs, symbols, or the like. In addition, it is possible to display not only still images but also moving images. Further, it is also possible to perform color display of the image D without being limited to single color display of the image D.

In the vehicle lamp 1 of the embodiment, in each of the above mentioned light source modules 2, the optical axis center S of the lens body 4 is located between two positions at which the red light emitting elements 7R are disposed. In this case, since the red light (R) emitted from the red light emitting elements 7R is emitted slightly upward from the lens body 4, it is easier to enter a visual field of the following driver.

The above mentioned tail lamp TLL and the brake lamp BRL that emit red light are lit with the red light emitting elements 7R at a higher frequency than the turn lamp TRL and the reverse lamp BCL and it is preferable to improve visibility for a following driver.

Accordingly, in the vehicle lamp 1 of the embodiment, it is possible to increase the visibility when the tail lamp TLL or the brake lamp BRL is displayed in the light emitting area E by optimizing a light distribution of the red light (R) emitted from the red light emitting elements 7R.

In addition, in the vehicle lamp 1 of the embodiment, in each of the above mentioned light source modules 2, the light distribution of the light L emitted from the light source 3 can be adjusted by the lens body 4. For example, in the light source modules 2 located in the region corresponding to the turn lamp TRL, it is also possible to widen a visible range of the turn lamp TRL by diffusing the light L emitted from the light source 3 using the lens body 4.

As described above, the vehicle lamp 1 of the embodiment can control the light distribution of the light L when the function lamps are displayed in the light emitting area E.

Further, the present invention is not particularly limited to the embodiment and various modifications may be made without departing from the scope of the present invention.

Specifically, while the case in which the present invention is applied to the rear combination lamp has been exemplarily described in the embodiment, when the rear combination lamp is configured, in addition to the above-mentioned configuration, for example, a combination with another member such as a light guide lens, a reflector, an extension, or the like, is also possible.

In addition, the plurality of light emitting elements 7 that constitute the above mentioned light source 3 are not particularly limited to the configuration in which the red light emitting elements 7R that emit red light (R), the green light emitting elements 7G that emit green light (G), and the blue light emitting element 7B that emit blue light (B) are disposed. For example, in addition to the light emitting elements 7R, 7G and 7B, a white light emitting element that emits white light or an orange light emitting element that emits orange light may be disposed.

In addition, a sky blue light emitting element that emits sky blue (cyan) light that is a complementary color (G+B) to red light (R), a reddish purple light emitting element that emits reddish purple (magenta) light that is a complementary color (R+B) of green light (G), and a yellow light emitting element that emits yellow (yellowish) light that is a complementary color (R+G) of blue light (B) may be disposed.

In addition, regarding the plurality of light emitting elements 7 that constitute the above mentioned light source 3, in addition to the above-mentioned LED, for example, a laser diode (LD) or the like may be used as long as the light L is radially emitted therefrom.

REFERENCE SIGNS LIST

1: Vehicle lamp
2: Light source module
3: light source
4: lens body
5: circuit board
6: lens array
7: light emitting element
7R: red light emitting element
7G: green light emitting element
7B: blue light emitting element
8: mounting substrate
50: light distribution control part
E: light emitting area
S: Optical axis center of lens body
TLL: tail lamp
BRL: brake lamp
TRL: turn lamp
BCL: back lamp
D: image

The invention claimed is:

1. A vehicle lamp comprising:
a plurality of light source modules, each of the light source modules consisting of (i) a light source comprising five light emitting diodes including two red light emitting diodes that emit red light, two green light emitting diodes that emit green light, and one blue light emitting diode that emits blue light, and (ii) a single lens body disposed in front of the light source,
wherein the plurality of light source modules are disposed in a matrix manner in a plane to configure at least one light emitting area,
wherein the five light emitting diodes in each light source are disposed in a cross shape in which one of the five light emitting diodes is disposed at a central position of the cross shape, and other ones of the five light emitting diodes are disposed at an upward position, a downward position, a leftward position, and a rightward position while having the central position interposed therebetween, and
wherein in each light source:
a first one of the red light emitting diodes is disposed at the downward position and a second one of the red light emitting diodes is disposed at one of the central position, the leftward position, and the rightward position,
a first one of the green light emitting diodes is disposed at the central position and a second one of the green light emitting diodes is disposed at one of the upward position, the leftward position, and the rightward position, or the first one of the green light emitting diodes is disposed at the upward position and the second one of the green light emitting diodes is disposed at one of the leftward position and the rightward position, and
the blue light emitting element is disposed at one of the upward position, the leftward position, and the rightward position.

2. The vehicle lamp according to claim 1, wherein an optical axis center of the lens body is located between two positions at which the red light emitting diodes of its corresponding light source are disposed.

3. The vehicle lamp according to claim 1, wherein, in the plurality of light source modules, the light sources are disposed on a same board, and the lens bodies constitute a lens array.

4. The vehicle lamp according to claim 1, further comprising a lighting controller configured to control lighting of the light emitting diodes for each of the light source modules,
wherein the lighting controller performs control of variably displaying at least one function lamp from among a tail lamp that emits red light, a brake lamp that emits red light, a turn lamp that emits orange light, and a back lamp that emits white light, in the light emitting area.

5. The vehicle lamp according to claim 1, wherein a lighting controller configured to control lighting of the light emitting diodes for each of the light source modules performs control of displaying an image in the light emitting area.

* * * * *